(12) United States Patent
Shibata

(10) Patent No.: US 9,503,647 B2
(45) Date of Patent: Nov. 22, 2016

(54) IMAGE STABILIZER, IMAGE PICKUP APPARATUS HAVING THE SAME, AND CONTROL METHOD OF IMAGE STABILIZER

(71) Applicant: CANON KABUSHIKI KAISHA, Tokyo (JP)

(72) Inventor: Nobuhiro Shibata, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 14/669,361

(22) Filed: Mar. 26, 2015

(65) Prior Publication Data
US 2015/0277139 A1 Oct. 1, 2015

(30) Foreign Application Priority Data

Apr. 1, 2014 (JP) .................................. 2014-075044
Mar. 9, 2015 (JP) .................................. 2015-045463

(51) Int. Cl.
H04N 5/232 (2006.01)
G02B 27/64 (2006.01)

(52) U.S. Cl.
CPC ........ *H04N 5/23287* (2013.01); *G02B 27/646* (2013.01); *G03B 2205/0015* (2013.01); *H04N 5/23258* (2013.01)

(58) Field of Classification Search
None
See application file for complete search history.

(56) References Cited

U.S. PATENT DOCUMENTS

| 6,091,448 A * | 7/2000 | Washisu | H04N 5/23248 348/208.16 |
| 2009/0262425 A1* | 10/2009 | Kimura | G03B 5/00 359/557 |
| 2010/0118402 A1* | 5/2010 | Washisu | G02B 27/646 359/557 |
| 2015/0103194 A1* | 4/2015 | Takeuchi | H04N 5/23287 348/208.6 |
| 2015/0146023 A1* | 5/2015 | Takeuchi | G02B 27/646 348/208.4 |
| 2015/0146024 A1* | 5/2015 | Takeuchi | G02B 27/646 348/208.4 |

FOREIGN PATENT DOCUMENTS

| JP | 08-062541 A | 3/1996 |
| JP | 2001-249276 A | 9/2001 |
| JP | 3706644 B2 | 8/2005 |

* cited by examiner

*Primary Examiner* — Justin P Misleh
(74) *Attorney, Agent, or Firm* — Fitzpatrick, Cella, Harper & Scinto

(57) ABSTRACT

An image stabilizer includes a first optical corrector moving along a direction different from an optical axis to correct an image shake, a second optical corrector moving along a direction different from the optical axis to correct an image shake, a controller moving at least one of the first and second optical correctors to correct an image shake, and a first position detector detecting information about a movement position of the first optical corrector. The controller performs image shake correction of the first optical corrector without image shake correction of the second optical corrector when the information about the movement position of the first optical corrector is equal to or less than a predetermined value, and performs image shake correction of the second optical corrector when the information about the movement position of the first optical corrector is more than the predetermined value.

9 Claims, 14 Drawing Sheets

IMAGE STABILIZER, IMAGE PICKUP APPARATUS HAVING THE SAME, AND CONTROL METHOD OF IMAGE STABILIZER

BACKGROUND OF THE INVENTION

Field of the Invention

The invention relates to an image stabilizer including an image stabilization function, an image pickup apparatus having the same, and a control method of the image stabilizer.

Description of the Related Art

Recent image pickup apparatus such as a camera and a video camera includes an image stabilization function so as to prevent an object image from blurring by a camera shake when shooting. For example, in Japanese Patent No. 3706644, moving a correcting lens system in a direction perpendicular to an optical axis controls image stabilization. Additionally, in Japanese Patent Laid-Open No. 2001-249276, using a plurality of correcting lens systems not just one correcting lens system controls image stabilization.

An urging spring holds a correcting lens, and power consumption of the correcting lens positioned near a center of a driving region is smaller because a force applied to the urging spring weakens, and power consumption of the correcting lens positioned near a circumference of the driving region is larger because a force applied to the urging spring strengthens. Moreover, since an image shake of the correcting lens positioned near the circumference of the driving region cannot be corrected, a deceleration process is performed so as not to move the correcting lens near the circumference of the driving region when the correcting lens comes near the circumference of the driving region.

However, when a large image shake is applied to an image pickup apparatus adopting the above technologies, an image stabilization function degrades by approach of the correcting lens to near the circumference of the driving region. As a result, a consumption current increases and an appearance worsens at the same time.

SUMMARY OF THE INVENTION

In view of foregoing, the invention provides an image stabilizer capable of suppressing power consumption and performing a highly attractive image shake correction even if a large image shake is applied, an image pickup apparatus having the same, and a control method of the image stabilizer.

An image stabilizer as one aspect of the invention includes a first optical corrector moving along a direction different from an optical axis so as to optically correct an image shake, a second optical corrector arranged at a position different from the first optical corrector in an optical direction, and moving along a direction different from the optical axis so as to optically correct an image shake, a controller which moves at least one of the first and second optical correctors based on a shake signal output from a shake detector so as to correct an image shake, and a first position detector detecting information about a movement position of the first optical corrector. The controller performs image shake correction of the first optical corrector without image shake correction of the second optical corrector when the information about the movement position of the first optical corrector is equal to or less than a first predetermined value. The controller performs image shake correction of the second optical corrector when the information about the movement position of the first optical corrector is more than the first predetermined value.

A control method of an image stabilizer having a first optical corrector moving along a direction different from an optical axis so as to optically correct an image shake, a second optical corrector arranged at a position different from the first optical corrector in an optical direction, and moving along a direction different from the optical axis so as to optically correct an image shake, a controller which moves at least one of the first and second optical correctors based on a shake signal output from a shake detector so as to correct an image shake, and a first position detector detecting information about a movement position of the first optical corrector as another aspect of the invention includes the step of performing image shake correction of the first optical corrector without image shake correction of the second optical corrector when information about a movement position of the first optical corrector is equal to or less than a first predetermined value, and image shake correction of the second optical corrector when information about a movement position of the first optical corrector is more than the first predetermined value by the controller.

Further features of the present invention will become apparent from the following description of exemplary embodiments with reference to the attached drawings.

DESCRIPTION OF THE PREFERRED EMBODIMENTS

Figure 1:
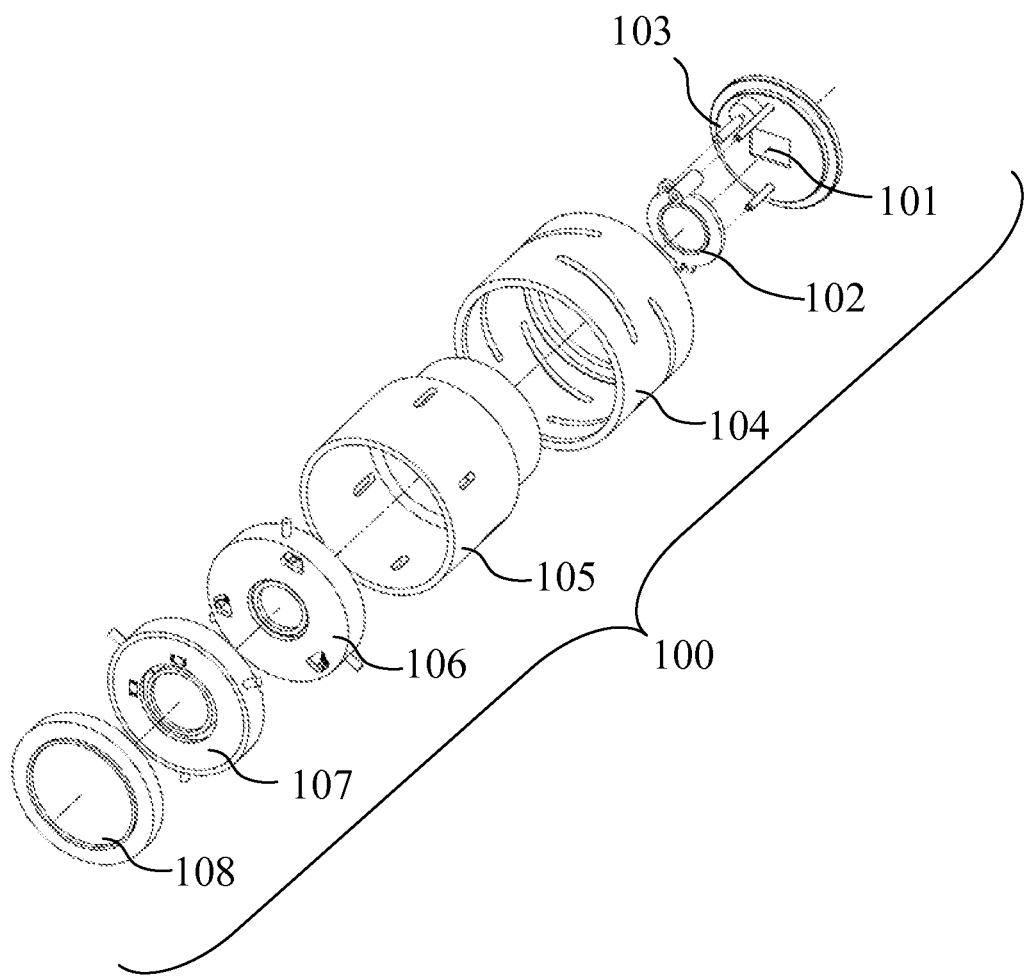
FIG. 1 is an exploded perspective view of a lens barrel of an image pickup apparatus according to an embodiment of the invention.

Exemplary embodiments of the invention will be described below with reference to the accompanied drawings. In each of the drawings, the same elements will be denoted by the same reference numerals and the duplicate descriptions thereof will be omitted.

FIG. 1 is an exploded perspective view of a lens barrel 100 of an image pickup apparatus according to an embodiment of the invention. An image pickup element 101 photoelectrically converts an object image formed by each lens group (image pickup optical system). A focus unit 102 adjusts focus adjustment. A stepping motor 103 drives the focus unit 102. Operating a cam cylinder 104 can change magnification of the image pickup optical system to a desired value. User may operate the cam cylinder 104 by hand, and a dedicated motor such as a DC motor may operate the cam cylinder 104. A fixing cylinder 105 pivotally supports the cam cylinder 104. A first image moving unit (first optical corrector) 106 and a second image moving unit (second optical corrector) 107 are vibration insulation units capable of suppressing an object image shake. A zoom lens 108 varies power.

Figure 2:
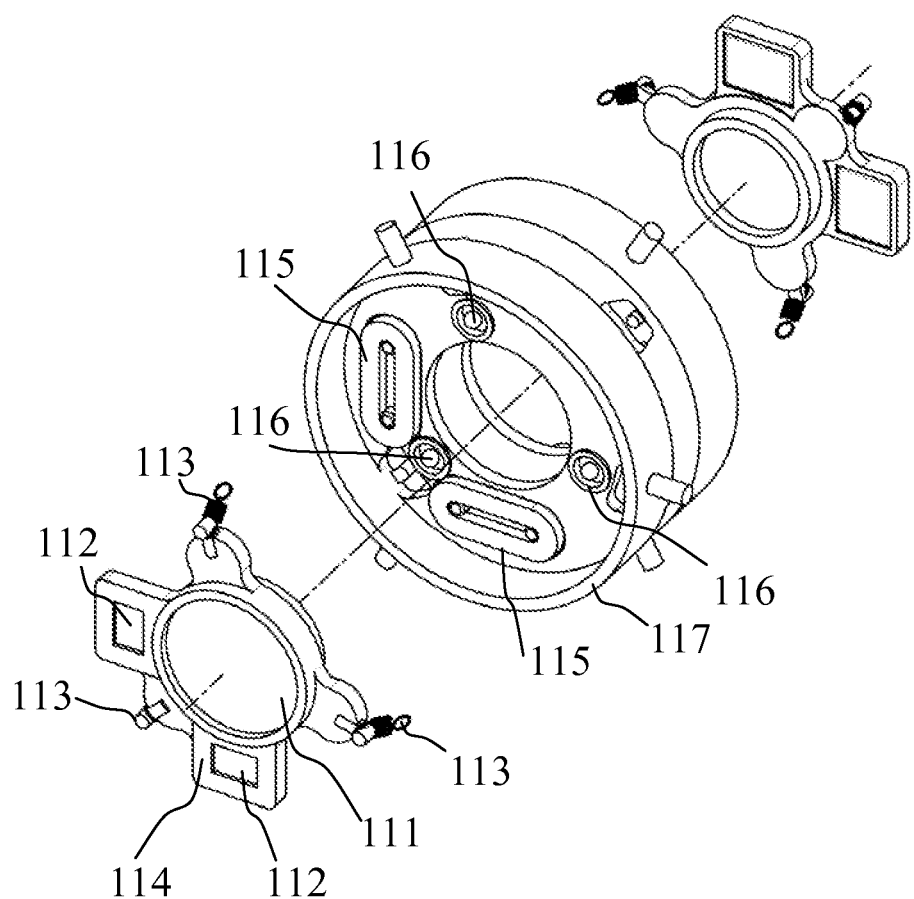
FIG. 2 is an exploded perspective view of first and second image moving units.

FIG. 2 is an exploded perspective view of the first and second image moving units 106 and 107. The first and second image moving units 106 and 107 are arranged at different places in an optical axis direction. A shift lens 111 eccentrically shifts from an optical axis so as to optically correct an image shake. A voice coil motor includes a magnet 112 and a coil 115, and moves a movable unit 114. A fixing base plate 117 cylindrically formed fixes the second image moving unit 107. An urging spring 113 is hooked by a spring hooking part provided on the fixing base plate 117 so as to hold the movable unit 114. A rolling ball 116 supports the movable unit 114 so as to be able to move in a plane of the fixing base plate 117 perpendicular to the optical axis. Since the configuration of the first image moving unit 106 is the same as that of the second image moving units 107, the detailed explanation of the first image moving unit 106 is omitted.

Figure 3:
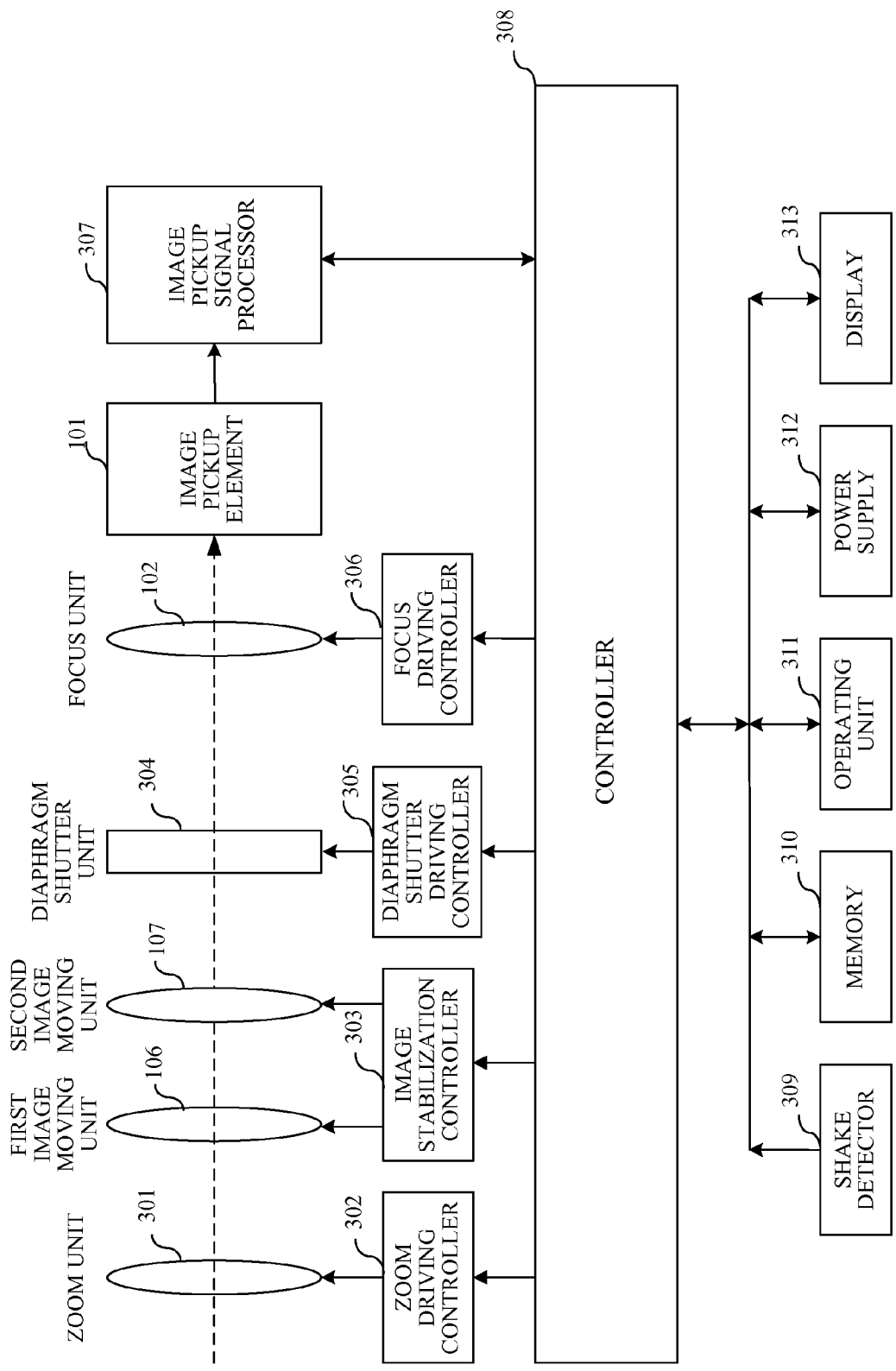
FIG. 3 is a block diagram of an image pickup apparatus.

FIG. 3 is a block diagram of the image pickup apparatus. A zoom unit 301 includes the cam cylinder 104, the fixing cylinder 105, and the zoom lens 108. A zoom driving controller 302 controls a drive of a zoom unit 301. An image stabilization controller 303 controls the first and second image moving units 106 and 107. A diaphragm shutter driving controller 305 controls a drive of a diaphragm shutter unit 304. A focus driving controller 306 controls a drive of the focus unit 102. An image pickup signal processor 307 converts an electric signal output from the image pickup element 101 to a picture signal. An internal CPU (central processing unit) of a controller 308 executes programs so that the controller 308 controlling the entire system performs various processes. A shake detector (shake detecting means) 309 detects shake amounts applied to an image pickup apparatus body. A memory 310 stores various data such as power consumption at each position in driving regions of the first and second image moving units 106 and 107. An operating unit 311 is a user interface so as to operate the image pickup apparatus. A power supply 312 supplies power to the entire system in accordance to a use, and stores information relating to a remaining capacity of a battery. A display 313 controls a display of an image acquired from the image pickup signal processor 307.

Figure 4A:
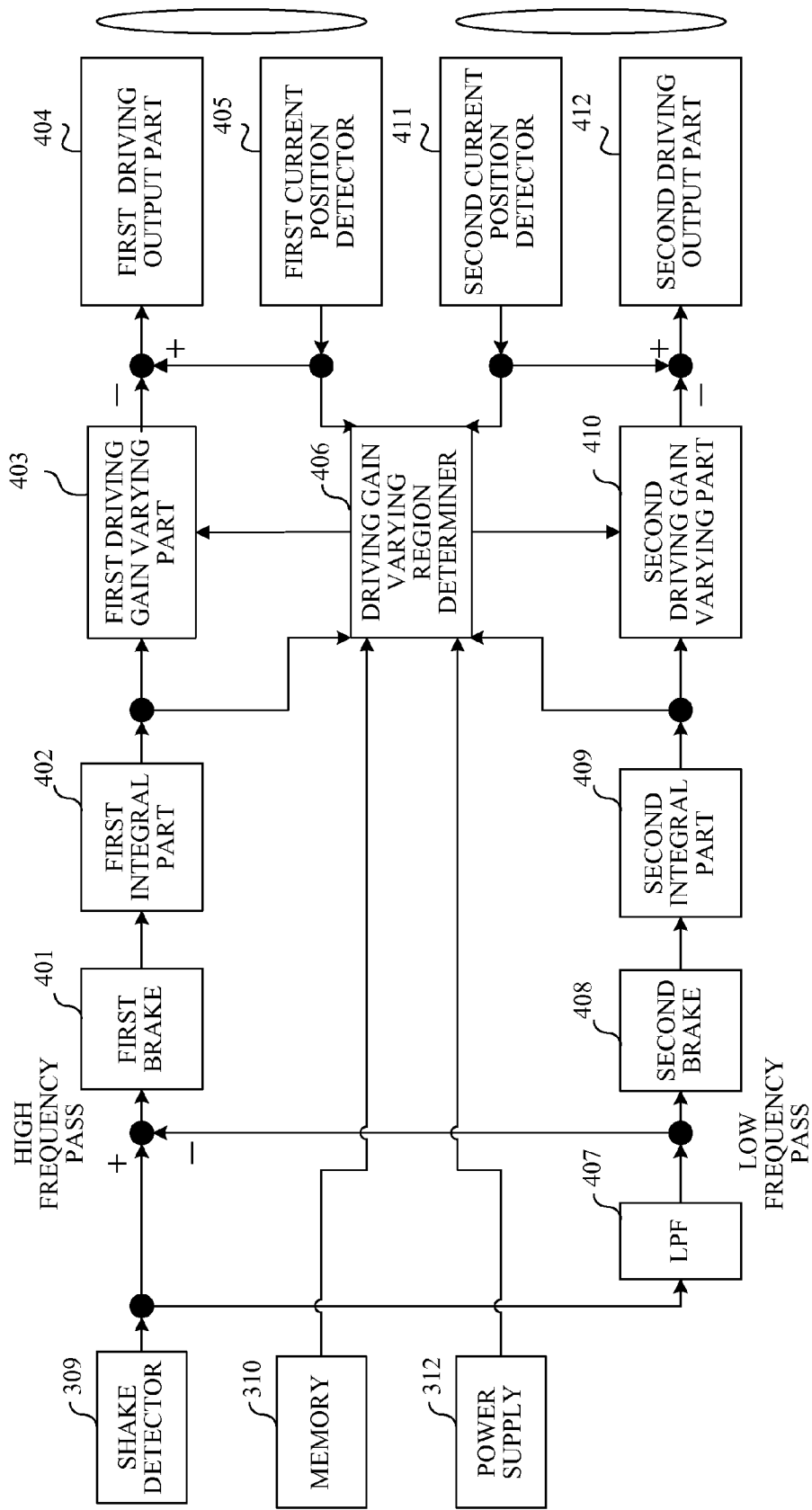
FIGS. 4A and 4B are block diagrams about image stabilization control.
Figure 4B:
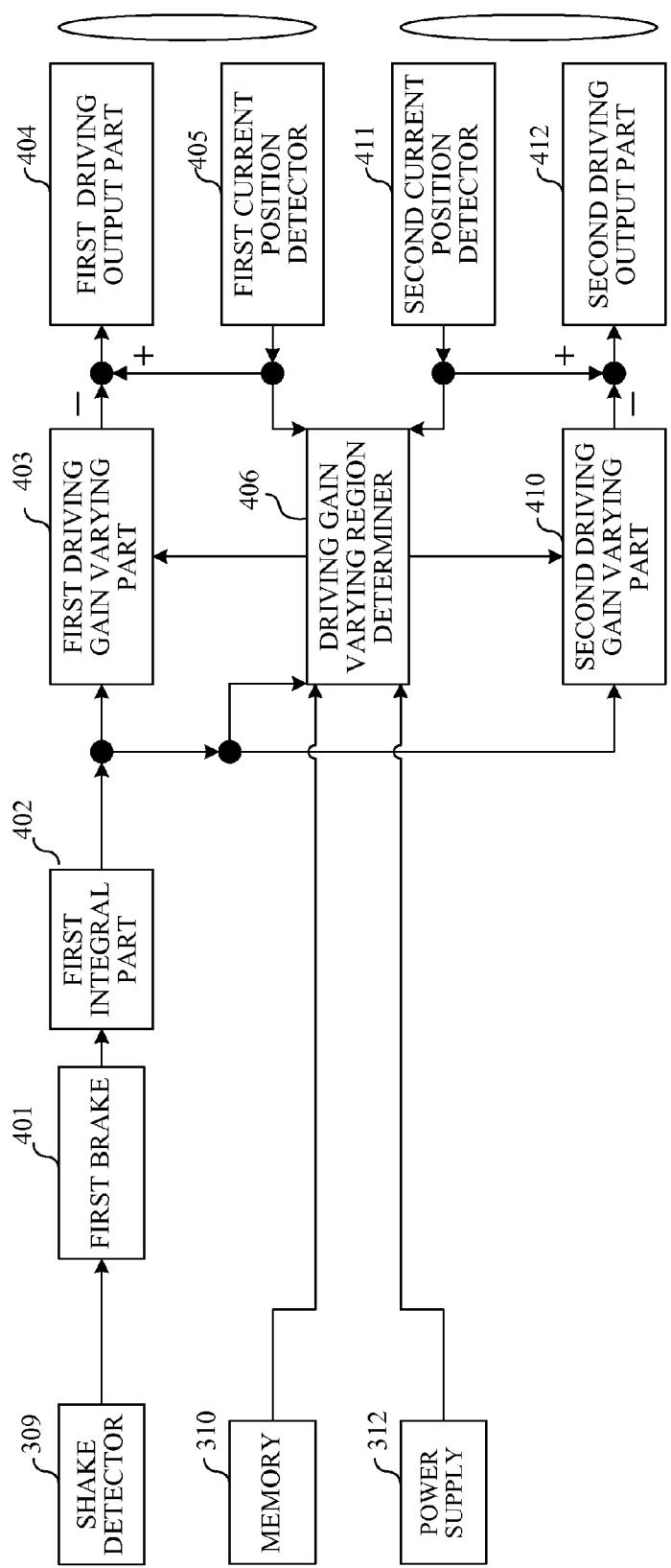

FIGS. 4A and 4B are block diagrams about image stabilization control. FIG. 4A is a schematic diagram illustrating a state that both the first and second image moving units 106 and 107 are driven, and FIG. 4B is a schematic diagram illustrating a state that either one of the first and second image moving units 106 and 107 are driven.

The configuration of FIG. 4B includes only one calculator to calculate a target position of an image moving unit unlike the configuration of FIG. 4A, and other configurations of FIGS. 4A and 4B are the same. A camera shake is generally a complex wave including a plurality of frequencies. Conventional image stabilization controls using one image moving unit has the best image stabilization function relative to a predetermined target (e.g., 5 Hz), and gradually drops its image stabilization function as separating from 5 Hz. Meanwhile, using two image moving units to perform image stabilization can performs the most suitable image stabilization control relative to different targets (e.g., 1 Hz and 7 Hz), and can achieve an image stabilization function within a wider band. Additionally, since power consumption increases when driving two image moving units at the same time, one image moving unit may be driven while the other image moving unit waits near the driving center.

Figure 5:
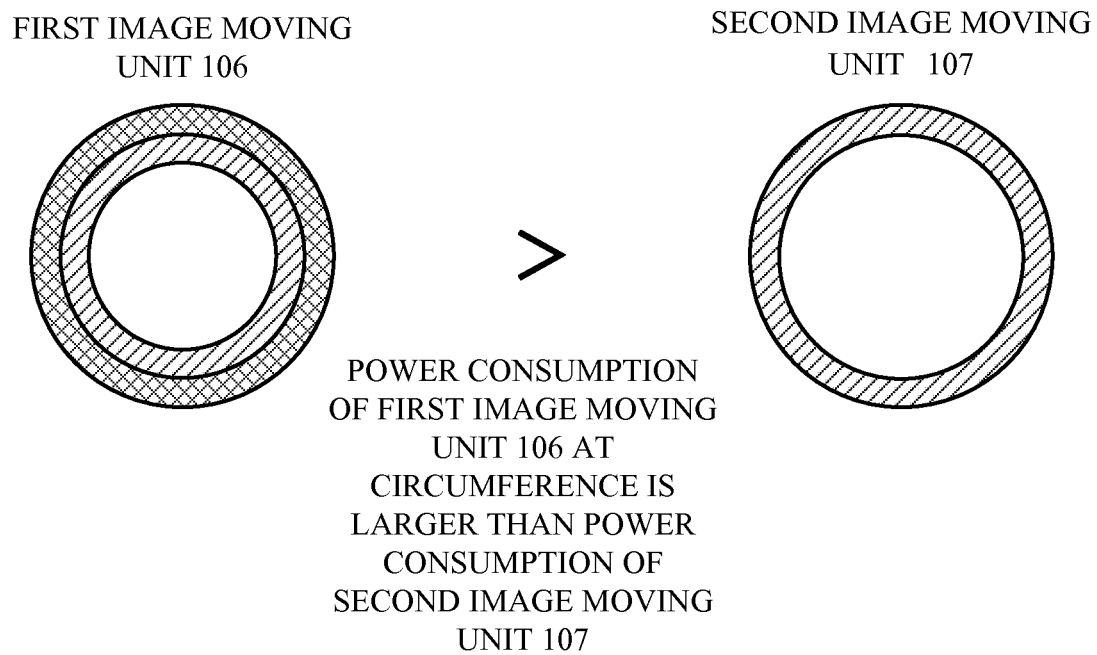
FIG. 5 is a relationship diagram between a driving region and power consumption.

As illustrated in FIG. 5, the configurations of the first and second image moving units 106 and 107 are the same, but power consumption consumed by each unit is not necessarily the same. Power consumption of an image moving unit positioned at a circumference of a driving region is different from power consumption of the image moving unit positioned at other positions by differences such as a size of a component, a weight, a spring coefficient, intensity fluctuation of magnetic force of a magnet, and the number of turns in a coil. The urging spring 113 is hooked between the movable parts 114 of the image moving units and the fixing base plate 117 so that the movable parts 114 keeps the balance at a center of the driving region. Accordingly, power consumption at the center of the driving region is the smallest and power consumption at a circumference thereof is the largest.

A LPF (low pass filter) 407 extracts a low frequency component among frequencies of shake amounts detected by the shake detector 309. Subtracting an output after passing the LPF 407 from unchanged output from the shake detector 309 can extract a high frequency component among frequencies of shake amounts. When each shake angular velocity of high and low frequency components is remarkably larger beyond a region capable of performing image stabilization, first and second brakes 401 and 408 clamp each shake angular velocity. First and second integral parts 402 and 409 convert a shake angular velocity to a shake angle. A target position to cancel the shake angle can be thus calculated. A shake angle cancel amount calculated using sensitivity depending on a focal length and a weighing amount corresponding to a driving gain is represented by an expression (1). The sensitivity depending on a focal length is determined by an optical system and typically increases toward a telescope side. When a driving gain becomes 100% so as to cancel the shake angle, the weighting amount corresponding to the driving gain is 1.0. Conversely, when the driving gain becomes 0% so as not to move a shift lens, the weighting amount corresponding to the driving gain is 0. When a target position is a circumference of a driving region, first and second driving gain varying parts 403, 410 performs a predetermined weighting to the target position so as not to enable the target position to approach the circumference. For example, when the first image moving unit 106 is driven while stopping the second image moving unit 107, the driving gains are 100% and 0%, respectively. Switching a drive, i.e. stopping the first image moving unit 106 while driving the second image moving unit 107 varies a driving gain of the first image to 100%, 90%, 80% . . . 10%, and 0% in order. At the same time, a driving gain of the second image moving unit 107 is varied to 0%, 10% . . . 80%, 90%, and 100%. A first current position detector (first position detecting means) 405 and a second current position detector (second position detecting means) 411 detect current positions of the first and second image moving units 106 and 107, respectively. Each of first and second driving output parts 404 and 412 calculates a deviation between a target position and a current position, and performs feedback control so that the deviation converges to zero. A driving gain varying region determiner 406 scales a driving region of each image moving unit based on power consumption at each position of the driving region, a current position, and a target position, and switches a drive of the image moving units.

$$\text{shake angle cancel amounts} = \text{shake angle} \times \text{sensitivity according to a focal length} \times \text{weighting amount} \quad \text{Expression (1)}$$

Figure 6A:
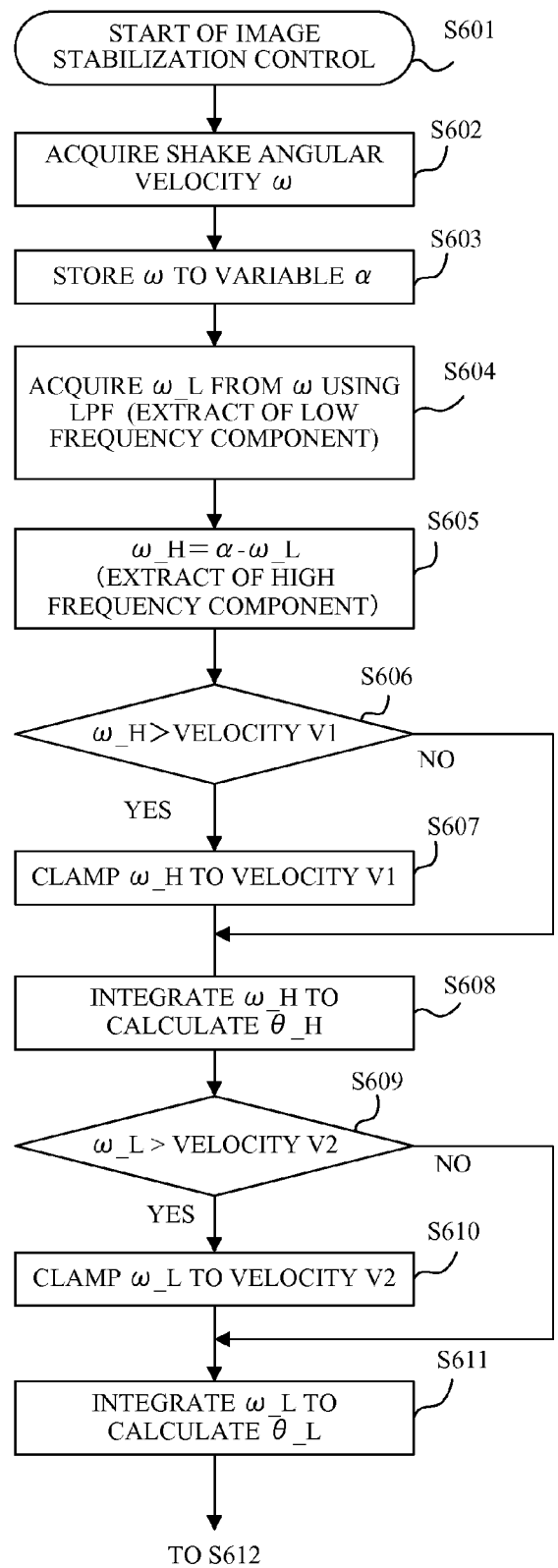
FIGS. 6A and 6B are flowcharts when driving both first and second image moving units to control image stabilization.
Figure 6B:
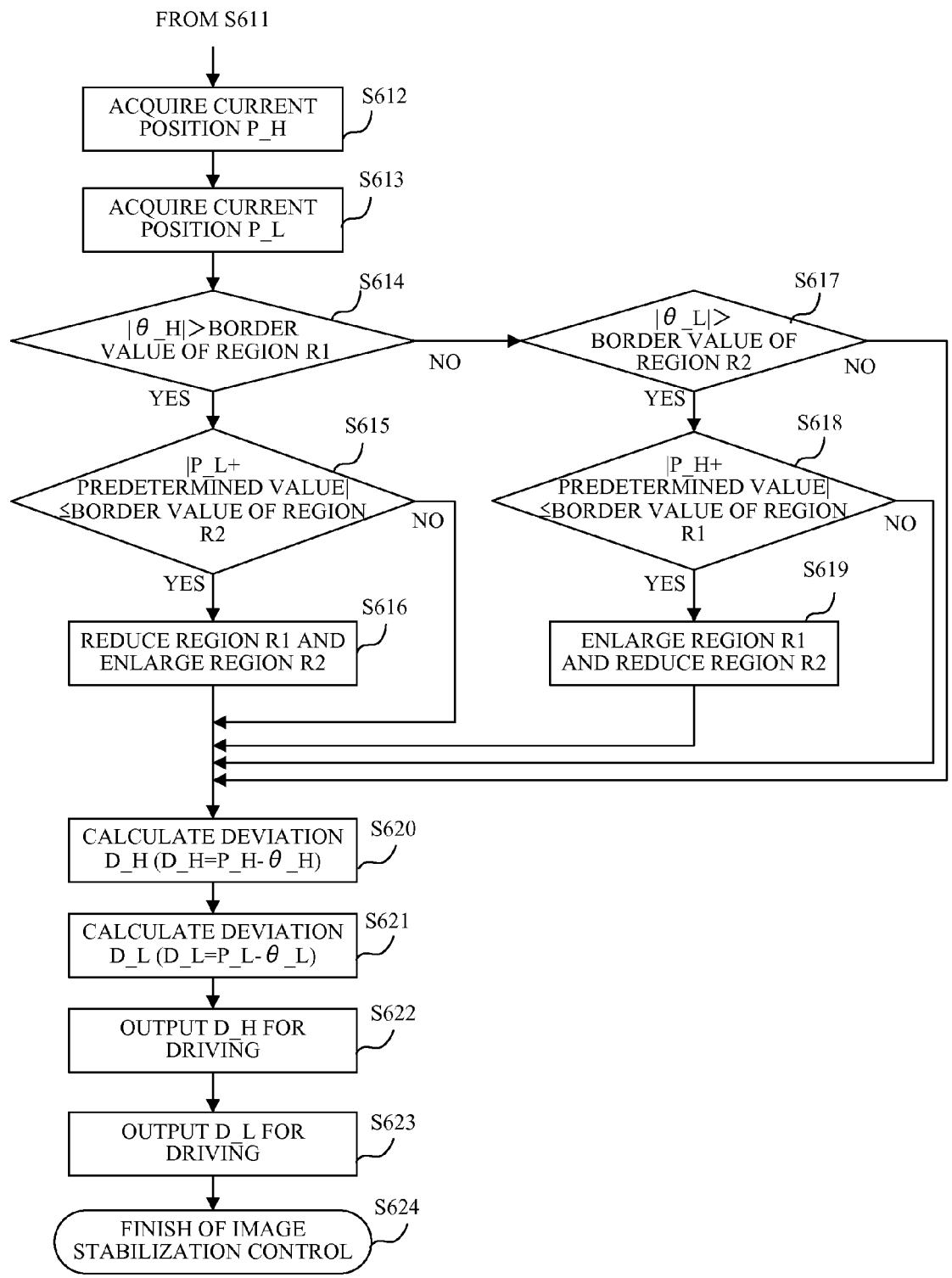

Here, an image stabilization control using two image moving units is explained referring to a flowcharts of FIGS. 6A and 6B. An image stabilization control starts at step S601. A shake angular velocity ω is acquired from the shake detector 309 at step S602. The acquired shake angular velocity ω is stored in a variable α at step S603. The LPF 407 extracts a shake angular velocity ω_L of a low frequency component from the shake angular velocity ω at step S604. Taking differences between the shake angular velocity ω and the shake angular velocity ω_L of the low frequency component extracts a shake angular velocity ω_H of a high frequency component at step S605. The shake angular velocity ω_H of the high frequency component is compared with a predetermined velocity V1 at step S606. When the shake angular velocity ω_H is more than the predetermined velocity V1, the first brake 401 clamps the shake angular velocity ω_H to the predetermined velocity V1 at step S607. When the shake angular velocity ω_H is equal to or less than the predetermined velocity V1, the flow proceeds to step S608 without clamping. The first integral part 402 integrates the shake angular velocity ω_H so as to calculate a target angle θ_H at step S608. Multiplying a target angle by a fixed constant practically acquires a target position (moving position), but the target angle θ_H is expedientially used as a target position in this embodiment. The shake angular velocity ω_L of the low frequency component is compared with a predetermined velocity V2 at step S609. When the shake angular velocity ω_L is more than the predetermined velocity V2, the second brake 408 clamps the shake angular velocity ω_L to the predetermined velocity V2 at step S610. When the shake angular velocity ω_L is equal to or less than the predetermined velocity V2, the flow proceeds to step S611 without clamping. The second integral part 409 integrates the shake angular velocity ω_L so as to calculate a target angle θ_L at step S611. Multiplying a target angle by a fixed constant practically acquires a target position, but the target angle θ_L is expedientially used as a target position in this embodiment. The first current position detector 405 acquires a current position P_H of the image moving unit performing image stabilization on a high frequency component side at step S612. The second current position detector 411 acquires a current position P_L of the image moving unit performing image stabilization on a low frequency component side at step S613.

Whether or not an absolute value |θ_H| of the target position is more than a border value (predetermined value) of a region R1 where power consumption is larger in a driving region of the image moving unit performing on the high component side is determined at step S614. When the absolute value |θ_H| is more than the border value of the region R1, whether or not an absolute value added the predetermined value to the current position P_L is equal to or less than a border value of a region R2 where power consumption is larger in a driving region of the image moving unit performing on the low component side is determined at step S615. When the absolute value is equal to or less than the border value at step S615, the driving gain varying region determiner 406 reduces the region R1 and enlarges the region R2 at step S616. When the absolute value is more than the border value of the region R2 at step S615, the flow proceeds to step S620 without changing the regions R1 and R2.

When the absolute value |θ_H| is less than the border value of the region R1 at step S614, whether or not an absolute value |θ_L| of the target position is more than the border value of the region R2 is determined at step S617. When the absolute value |θ_L| is more than the border value of the region R2, whether or not an absolute value added the predetermined value to the current position P_H is equal to or less than the border value of the region R1 of the image moving unit performing on the high component side is determined at step S618. When the absolute value is equal to or less the border value at step S618, the driving gain varying region determiner 406 enlarges the region R1 and reduces the region R2 at step S619. When the absolute value is more than the border value of the region R1 at step S618, the flow proceeds to step S620 without changing the regions R1 and R2.

A deviation D_H being a difference between the current position P_H and the target position θ_H is calculated at step S620. A deviation D_L being a difference between the current position P_L and the target position θ_L is calculated at step S621. The deviation D_H is converted to a voltage for driving output at step S622. The deviation D_L is converted to a voltage for driving output at step S623. The image stabilization control finishes at step S624.

Figure 7:
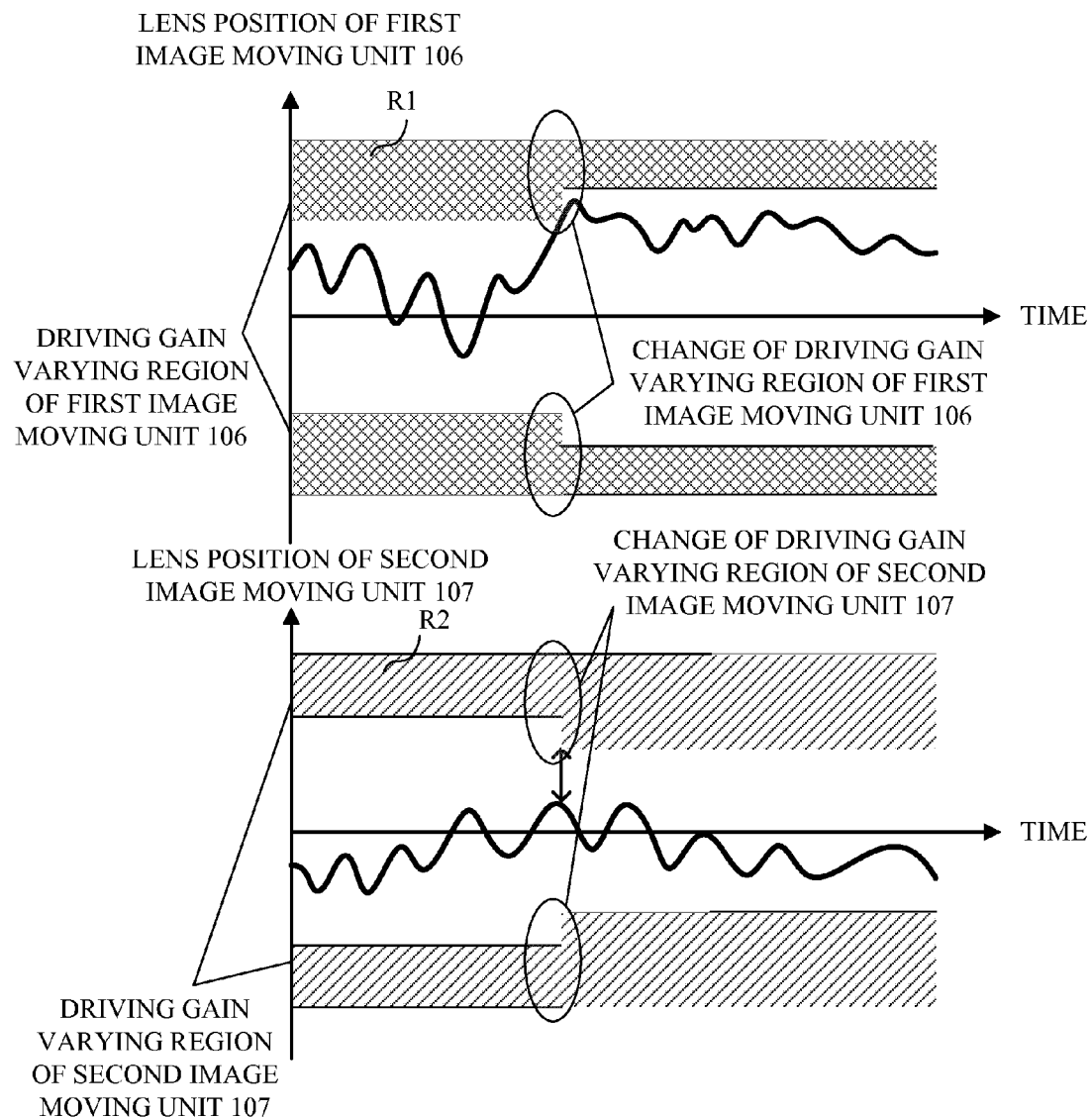
FIG. 7 is a relationship diagram between a locus of each image moving unit and a driving gain varying region when driving both first and second image moving units to control image stabilization.

An example of the image stabilization control described above is illustrated in FIG. 7. FIG. 7 is a relationship diagram between a locus of each image moving unit and a driving gain varying region (region where power consumption is higher) when driving both the first and second image moving units 106 and 107 to control image stabilization. The abscissa axis denotes a lens position, and the ordinate axis denotes time. In figure, the first and second image moving units 106 and 107 performs image stabilization at the same time. When a target position of the first image moving unit 106 is within the driving gain varying region R1 at a predetermined time, a current position of the second image moving unit 107 has enough differences relative to the driving gain varying region R2. Then, the driving gain varying region R1 of the first image moving unit 106 is enlarged, and the driving gain varying region R2 of the second image moving unit 107 is reduced. When replacing the first image moving unit 106 with the second image moving unit 107, the same control is performed.

Figure 8:
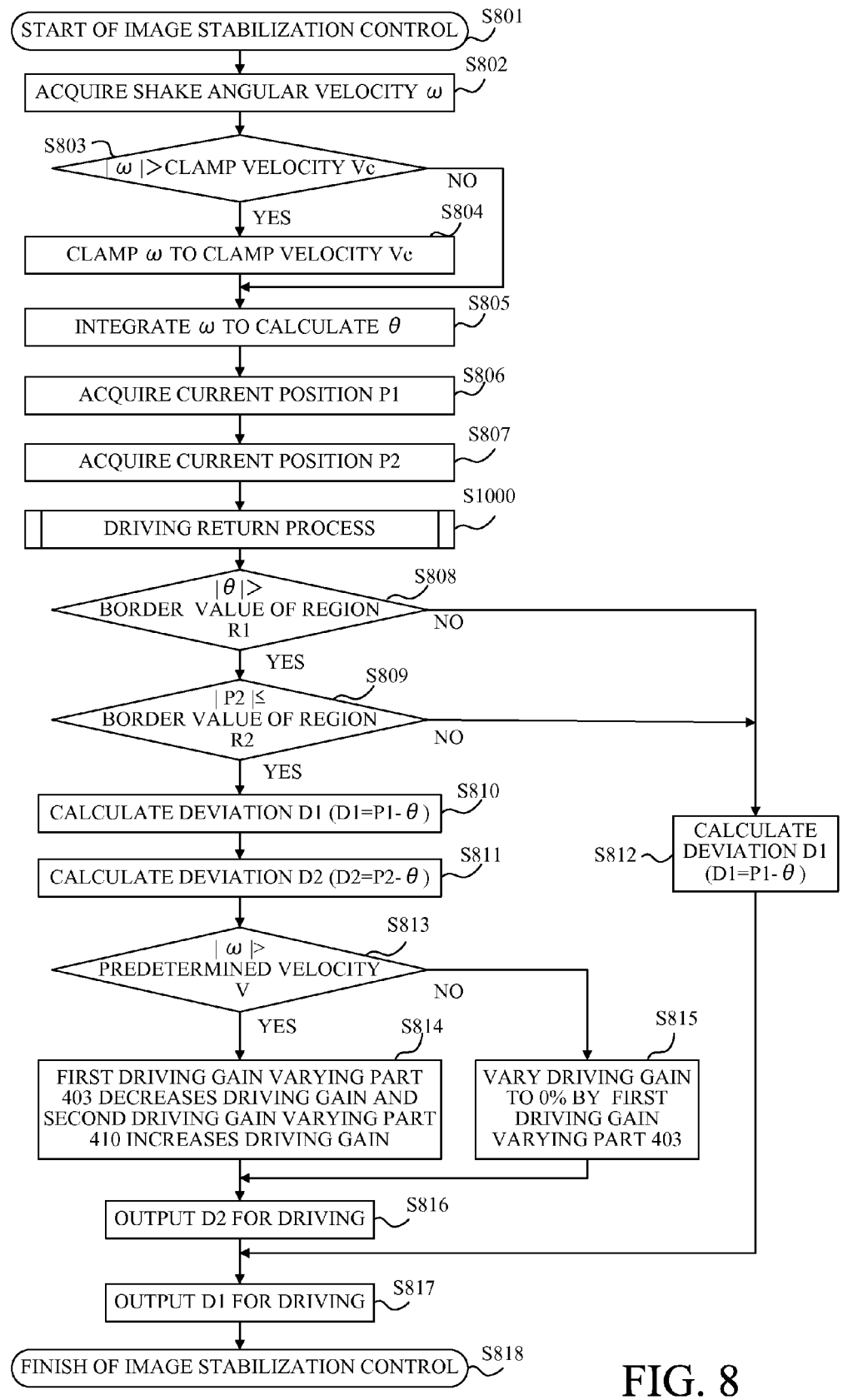
FIG. 8 is a flowchart when driving either one of first and second image moving units to control image stabilization.

Next, an image stabilization control driving either one of the first and second image moving units 106 and 107 is explained referring to a flowchart of FIG. 8. An image stabilization control starts at step S801. Here, driving the first image unit 106 while stopping the second image moving unit 107 is explained. A shake angular velocity ω is acquired from the shake detector 309 at step S802. An absolute value of the shake angular velocity ω is compared with a clamping velocity Vc at step S803. When the shake angular velocity ω is more than the clamping velocity Vc, the first brake 401 clamps the shake angular velocity ω to the clamping velocity Vc at step S804. When the shake angular velocity ω is equal to or less than the clamping velocity Vc, the flow proceeds to step S805 without clamping. The first integral part 402 integrates the shake angular velocity ω so as to calculate a target angle θ at step S805. Multiplying a target angle by a predetermined constant practically acquires a target position, but the target angle θ is expedientially used as a target position in this embodiment. The first current position detector 405 acquires a current position P1 of the first image moving unit 106 at step S806. The second current position detector 411 acquires a current position P2 of the second image moving unit 107 at step S807. A driving return process described below is performed at step S1000.

Whether or not the absolute value |θ| of the target position is more than the border value of the region R1 where power consumption is larger in the driving region of the first image moving unit 106 is determined at step S808. When the absolute value |θ| is more than the border value of the region R1, whether or not an absolute value |P2| of the current position of the second image moving unit 107 is equal to or less than the border value of the region R2 where power consumption is larger in the driving region of the second image moving unit 107 is determined at step S809. When the absolute value |P2| is equal to or less than the border value of the region R2, a deviation D1 being a difference between the current position P1 and the target position θ is calculated at step S810. A deviation D2 being a difference between the current position P2 and the target position θ is calculated at step S811.

The shake angular velocity ω is compared with the predetermined velocity V when switching a drive at step S813. When the shake angular velocity ω is larger than the predetermined velocity V, the first driving gain varying part 403 gradually decreases the driving gain of the first image moving unit 106 at step S814. At the same time, the second driving gain varying part 410 gradually increases the driving gain of the second image moving unit 107. Here, gradually varying keeps a sum of the driving gains of the first and second image moving units 106 and 107 at 100%. For example, feedback control varies the driving gain of the first image moving unit 106 to 100%, 50%, and 0% in order, and varies the driving gain of the second image moving unit 107 to 0%, 50%, and 100% in order. Additionally, shake angular velocity ω is equal to or less than the predetermined velocity V at step S813, the first driving gain varying part 403 varies the driving gain of the first image moving unit 106 to 0% at step S815. The deviation D2 is converted to a voltage for driving output at step S816. The deviation D1 is converted to a voltage for driving output at step S817. Moreover, when the absolute value |θ| is equal to or less than the border value of the region R1 (predetermined value) at step S808 or at the absolute value |P2| is more than the border value of the region R2 at step S809, the deviation D1 being between the current position P1 and the target position θ is calculated at step S812. Since a switch of a drive is then not generated, the deviation D1 is converted to a voltage for driving output at step S817. The image stabilization control finishes at step S818.

If power consumption at the circumference of the driving region of one of the first and second image moving units 106 and 107 is smaller than that of the other image moving unit, the one image moving unit performs an image stabilization control at wider range compared with the other image moving unit. Thus, the one image moving unit may firstly move.

Figure 9:
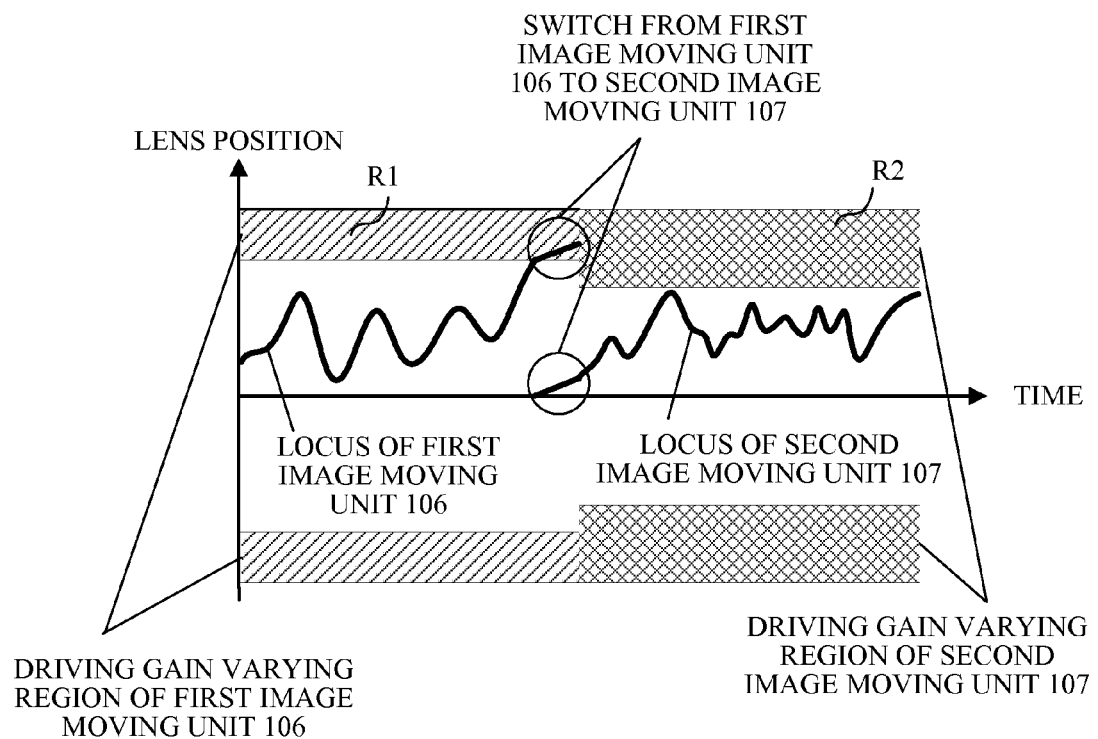
FIG. 9 is a relationship diagram between a locus of each image moving unit and a driving gain varying region when driving either one of first and second image moving units to control image stabilization.

An example of the image stabilization control set forth above is illustrated in FIG. 9. FIG. 9 is a relationship diagram between a locus of each image moving unit and a driving gain varying region (region where power consumption is higher) when driving either one of the first and second image moving units 106 and 107 to control image stabilization. The abscissa axis denotes a lens position, and the ordinate axis denotes time. In figure, the first image moving unit 106 performs image stabilization, and the second moving unit 107 stops near the center of the driving region. In figure, the first and second image moving units 106 and 107 perform image stabilization until the predetermined time passes after the target position of the first image moving unit 106 is within the driving gain varying region R1, and after passing the predetermined time, the second image moving unit 107 only performs image stabilization. When the target position of the first image moving unit 106 is within the driving gain varying region R1 at the predetermined time, the second image moving unit 107 may start to drive at the same time as the first image moving unit 106 stops unlike FIG. 9. Additionally, when the target position of the second image moving unit 107 is within the driving gain varying region R2, the gain also varies. Before the driving image moving unit enters into the circumference of the driving region, the drive of the image moving unit stops and the drive of the other image moving unit starts. Accordingly, an image stabilization range can be enlarged than a range of an image stabilization using one image moving unit with suppressing power consumption.

Figure 10:
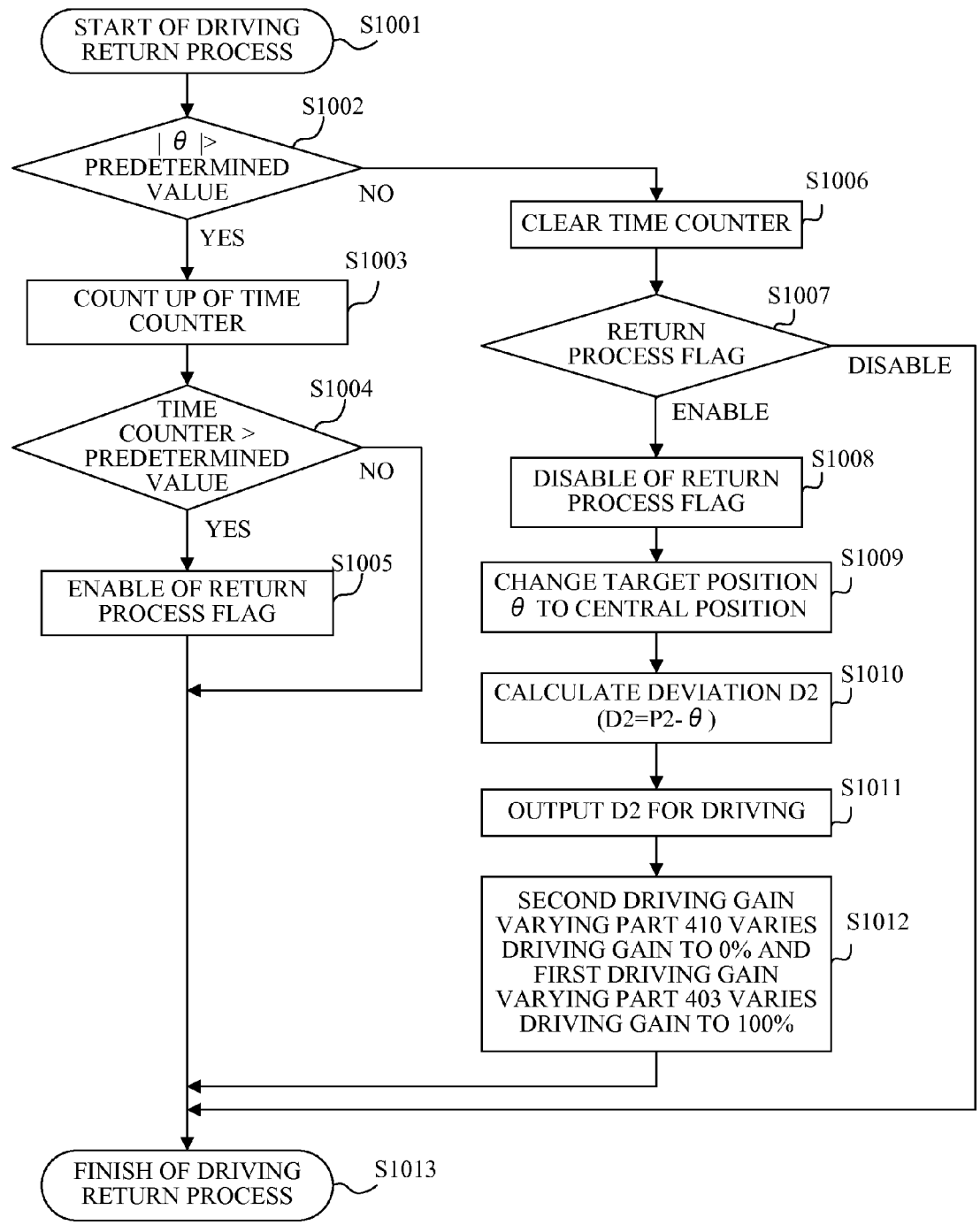
FIG. 10 is a flowchart of a driving return process.

Next, the driving return process is explained using a flowchart of FIG. 10. The driving return process starts at step S1001. Here, a state that the drive has already switched from the first image moving unit 106 to the second image moving unit 107, and the first image moving unit 106 is positioned at the circumference of the driving region is explained. The absolute value |θ| of the target position is compared with predetermined amounts at step S1002. When the absolute value |θ| of the target position is larger than the predetermined amounts, a time counter is counted up at step S1003. The time counter is compared with a predetermined time at step S1004. When the time counter passes the predetermined time, a return process flag is enabled at step S1005.

When the absolute value |θ| is equal to or less than the predetermined amounts at step S1002, the time counter is cleared at step S1006. Enabling and disabling of the return process flag is determined at step S1007. When enabling of the return process flag is determined, the return process flag is disabled at step S1008 and after the target position θ is changed to the central position at step S1009. The deviation D2 being a difference between the current position P2 of the second image moving unit 107 and the target position is calculated at step S1010. The deviation D2 is converted to a voltage for driving output at step S1011. The second driving gain varying part 410 gradually decreases the driving gain of the second image moving unit 107 to 100%, 90%, 80% . . . 10%, and 0% in order and finally varies the driving gain to 0% at step S1012. Further, the first driving gain varying part 403 gradually decreases the driving gain of the first image moving unit 106 to 0%, 10% . . . 90%, and 100% in order and finally varies the driving gain to 100%. As a result, the drive of the first and second image moving units 106 and 107 are switched. The driving return process finishes at step S1013.

Figure 11:
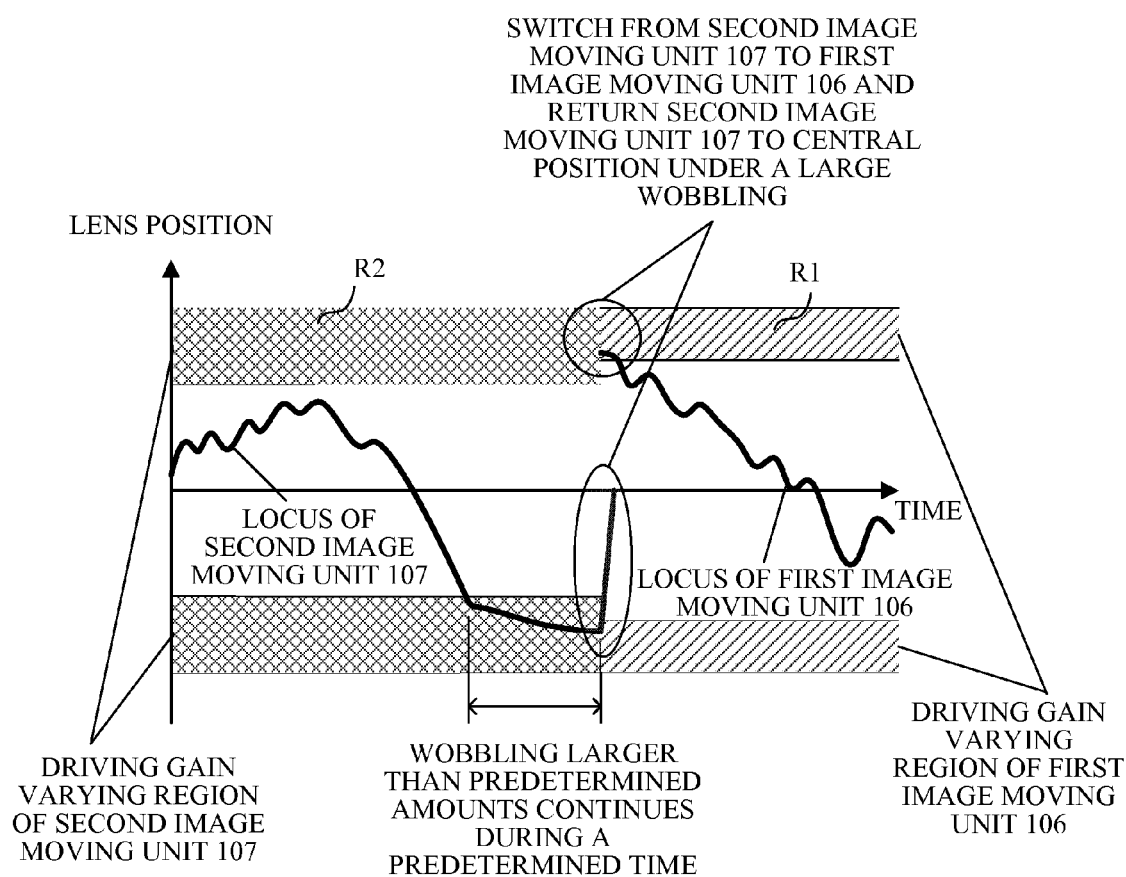
FIG. 11 is a relationship diagram between a locus of each image moving unit in a driving return process and a driving gain varying region.

An example of the driving return process set forth above is illustrated in FIG. 11. FIG. 11 is a relationship diagram between a locus of each image moving unit in the driving return process and the driving gain varying region (region where power consumption is higher). The abscissa axis denotes a lens position, and the ordinate axis denotes time. In figure, the second image moving unit 107 performs image stabilization, and the first moving unit 106 stops near the driving gain varying region R1. When the image pickup apparatus is largely swiveled at a constant velocity or more, i.e., a large panning operation is performed (panning is determined), offset components larger than the constant velocity is given to the shake angular velocity ω. Offset components is also given to the integrated target angles θ. The target position thus closes to an end of the driving region precipitously. As a result, performing the large panning operation may weaken an image stabilization effect. When a wobbling more than a predetermined amounts is added to the second image moving unit 107 during a predetermined time, the second driving output part 412 moves the second image moving unit 107 to the central position of the driving region. After, the drive of the first image driving unit 106 starts at the same time as the driving gain varying region determiner 406 stops the second image moving unit 107. Since the above operation moves one image moving unit to the central position at timing when a large vibration including a large panning operation is generated, the switch of the drive next generated can be accepted.

Figure 12:
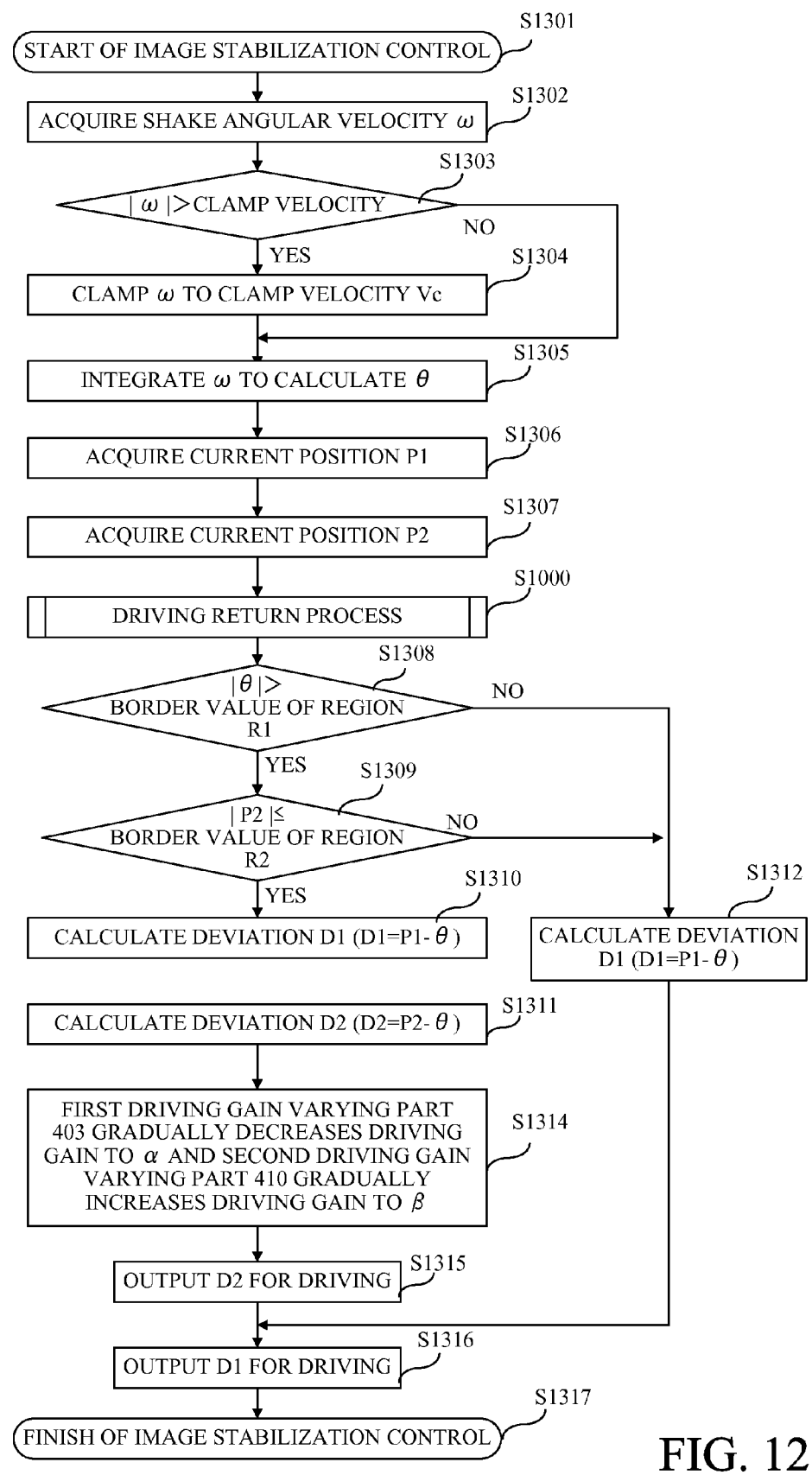
FIG. 12 is a flowchart when either one of first and second image moving units enters into a region where power consumption is larger in a driving region in the middle of driving either one of first and second image moving units to control image stabilization.

Next, when either of the first and second image moving units enters into a region where power consumption is larger in the driving region in the middle of driving the either image moving units to control image stabilization, each gain of the first and second image moving units is varied so that both image moving units finally are driven. The above case is explained referring to FIG. 12.

Here, the drive of the first image moving unit 106 while stopping the second image moving unit 107 is explained as an example.

Since steps S1301 to S1311 are the same processes as steps S801 to S811 in FIG. 8, the description is omitted.

Since power consumption increases when the first image moving unit 106 closes near the end of the driving region, the first driving gain varying part 403 gradually decreases the driving gain to a predetermined gain α at step S1314. Decreasing the driving gain suppresses power consumption, but the image stabilization function drops. The second driving gain varying part 410 gradually increases the driving gain to a predetermined gain β so as to cover the drop of the image stabilization function.

Since steps S1315 to S1317 are the same processes as steps S816 to S818 in FIG. 8, the description is omitted.

Since a distance to the end of the driving region is enough, using a unit having a large driving region as the first image moving unit is effective for saving power.

Further, using a unit having low power consumption as the first image moving unit is effective for saving power.

An example of applying the invention to the image pickup apparatus is explained in this embodiment, but the invention is applied to not only the image pickup apparatus but also a mobile apparatus including the image pickup apparatus.

Moreover, since the power supply 312 acquires a remaining capacity of a battery, a border of a region having high power consumption reduces (narrows) to save power consumption when the remaining capacity of the battery is less than a predetermined amount.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-075044, filed on Apr. 1, 2014 and No. 2015-45463, filed on Mar. 9, 2015, which are hereby incorporated by reference wherein in their entirety.

What is claimed is:

1. An image stabilizer comprising:
a first optical corrector moving along a direction different from an optical axis so as to optically correct an image shake;
a second optical corrector arranged at a position different from the first optical corrector in an optical direction, and moving along a direction different from the optical axis so as to optically correct an image shake;
a controller which moves at least one of the first and second optical correctors based on a shake signal output from a shake detector so as to correct an image shake; and
a first position detector detecting information about a movement position of the first optical corrector,
wherein the controller performs image shake correction of the first optical corrector without image shake correction of the second optical corrector when the information about the movement position of the first optical corrector is equal to or less than a first predetermined value, and the controller performs image shake correction of the second optical corrector when the information about the movement position of the first optical corrector is more than the first predetermined value.

2. The image stabilizer according to claim 1, wherein when the information about the movement position of the first optical corrector is more than the first predetermined value, the controller performs image shake corrections of the first and second optical correctors during a predetermined time, and stops image shake correction of the first optical corrector while continuing image shake correction of the second optical corrector after passing the predetermined time.

3. The image stabilizer according to claim 1, wherein power consumption in a region where the information about the movement position of the first optical corrector is more than the first predetermined value is larger than power consumption in a region where the information about the movement position of the first optical corrector is equal to or less than the first predetermined value.

4. The image stabilizer according to claim 1, further comprising a second position detector detecting information about a movement position of the second optical corrector,
wherein when the information about the movement position of the first optical corrector is more than the first predetermined value and the information about the movement position of the second optical corrector is equal to or less than a second predetermined value, the controller performs image shake correction of the second optical corrector.

5. The image stabilizer according to claim 1, wherein when the information about the movement position of the first optical corrector is more than the first predetermined value, a gain of the shake signal controlling the first optical corrector gradually decreases and a gain of the shake signal controlling the second optical corrector gradually increases.

6. The image stabilizer according to claim 1, wherein when the information about the movement position of the first optical corrector is more than the first predetermined value, the second optical corrector corrects an image shake and the first optical corrector moves to a driving center of the first optical corrector.

7. The image stabilizer according to claim 1, wherein the first optical corrector moves to a driving center of the first optical corrector when determining panning.

8. An image pickup comprising the image stabilizer according to claim 1.

9. A control method of an image stabilizer including a first optical corrector moving along a direction different from an optical axis so as to optically correct an image shake, a second optical corrector arranged at a position different from the first optical corrector in an optical direction, and moving along a direction different from the optical axis so as to optically correct an image shake, a controller which moves at least one of the first and second optical correctors based on a shake signal output from a shake detector so as to correct an image shake, and a first position detector detecting information about a movement position of the first optical corrector, the control method comprising the step of:

performing image shake correction of the first optical corrector without image shake correction of the second optical corrector when information about a movement position of the first optical corrector is equal to or less than a first predetermined value, and image shake correction of the second optical corrector when information about a movement position of the first optical corrector is more than the first predetermined value by the controller.

* * * * *